D. D. LONG.
FEEDING ATTACHMENT.
APPLICATION FILED JULY 21, 1921.
1,420,200.
Patented June 20, 1922.
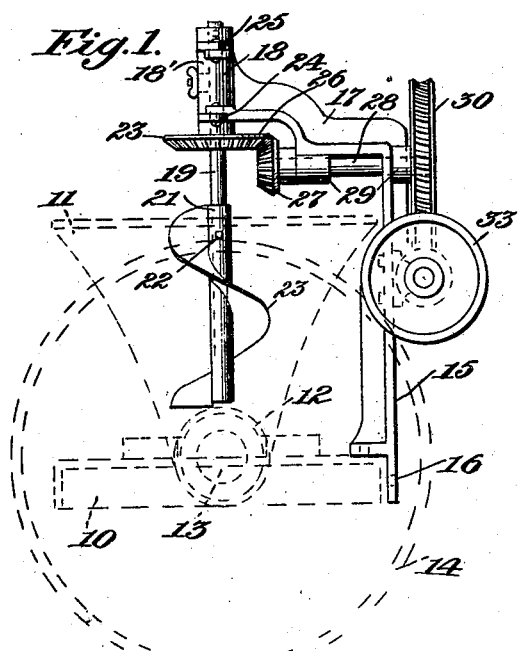
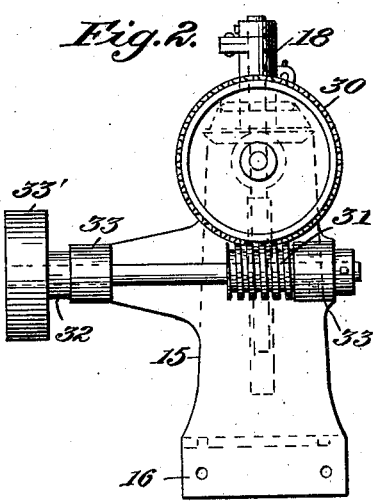
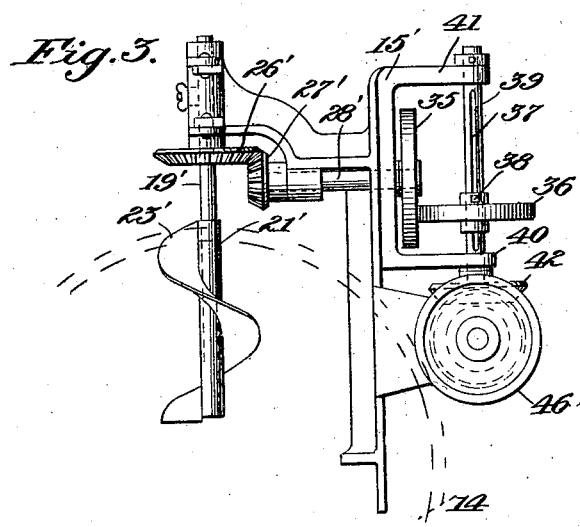
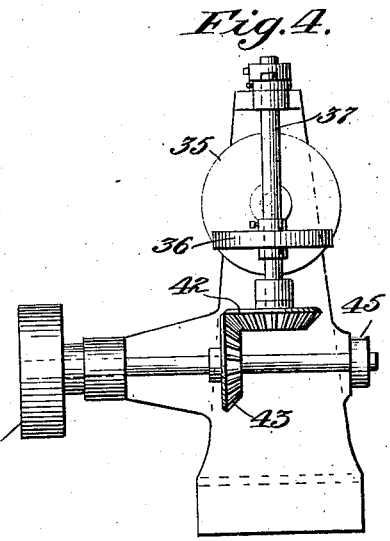
Inventor:
Daniel D. Long,
By Cushman, Bryant & Darby
Att'ys.

UNITED STATES PATENT OFFICE.

DANIEL D. LONG, OF BOISE, IDAHO.

FEEDING ATTACHMENT.

1,420,200. Specification of Letters Patent. Patented June 20, 1922.

Application filed July 21, 1921. Serial No. 486,410.

*To all whom it may concern:*

Be it known that I, DANIEL D. LONG, a citizen of the United States, residing at Boise, in the county of Ada and State of Idaho, have invented new and useful Improvements in Feeding Attachments, of which the following is a specification.

This invention relates to grinding machines, and has as its object to provide an attachment for such machines which will uniformly feed the meat or other material to be ground to the cutters.

The ordinary grinding machine now employed for grinding meat and the like comprises a hopper, generally open at the top, having its lower end in communication with a grinding worm, to which the meat gravitates from the hopper. In using these machines it is now the custom for the operator to pack the meat into the hopper and to keep it pressed down against the cutting worm with his hands. This mode of operation not infrequently results in serious accidents because of the accidental engagement of the hands with the cutting worm or other type of cutting instrumentality in the machine.

It is an object of this invention to provide a device which may be readily applied to the ordinary grinder without altering the mechanical structure of the grinder, and which will uniformly feed the meat to the cutter and thereby keep the cutter working at its highest capacity.

Another object of the invention is to provide a feeding attachment which, preferably, is operated from the grinder driving mechanism by a variable speed driving means which will permit variation in the relative speeds of the cutter and the feeder.

A still further object of the invention is to provide a construction in which the feeding member, such as a spiral upon a rotating shaft, may be readily removed in order to facilitate the cleaning of the grinding machine hopper and the feeding member.

The above and other objects of the invention will become more obvious as the description proceeds. In the accompanying drawings there are shown two forms of a device in which the invention may be embodied, although, obviously, these forms are merely illustrative of the invention and might be considerably varied without departing from the scope of the invention.

In the drawings:—

Fig. 1 is an elevational view of the attachment showing the same applied to a grinding machine, Fig. 2 is a side elevational view, Fig. 3 is a view similar to Fig. 1 showing a slightly modified form of the device, and Fig. 4 is a side elevational view of the form shown in Fig. 3.

Referring to the drawings for a more detailed description, 10 indicates a base or platform of an ordinary meat grinding machine having a hopper 11 in communication, at its lower end, with a grinding worm 12 upon a shaft 13 which may be driven through a gear 14 upon the shaft by any suitable driving mechanism (not shown).

The feeding attachment for the grinder comprises a standard 15, which, at its lower end, may be bolted to the base 10, as indicated at 16, and at its upper end has a substantially horizontally extending arm 17 provided with a bearing 18 in which is mounted a rotatable vertical shaft 19. The shaft extends downwardly from its bearing 18 and operates a feeding member positioned within the hopper and shown as a hollow rod 21, into which the end of the shaft projects, held upon the shaft as by a set screw 22. The rod 21 is provided with a circumferentially extending spiral vane 23 which, obviously, engages the meat within the hopper as the shaft 19 is rotated, and forces the same against the cutter 12.

It is desirable that the feeding member be removable so that both the hopper and the feeding member may be cleaned. This object may be attained either by removing the rod 21 from the shaft 19, or by removing the shaft from the standard. It will be noted that the bearing 18 is formed with a removable bearing half or cap 18' which is detachably held in position upon the standard as by means of pins 24 passing through ears 25 formed on each bearing half.

The shaft 19 should be rotated in synchronism with the grinding machine cutter 12, and this may be accomplished by operating the shaft through driving connections from the grinding machine shaft 13, or any other shaft upon the grinder. In the illustrated form of the device the shaft 19 has fixedly secured thereto adjacent its bearing a bevel gear 26 in mesh with a bevel gear 27 upon the outer end of a shaft 28 having bearings 29 in the standard. The other end of the shaft 28 has secured thereon a worm gear 30 driven through a worm 31 upon a horizontal shaft 32 positioned in bearings 33 in the standard. The outer end of the shaft 32 may be provided with a gear 33' in mesh with the gear 14 on the grinder shaft. Manifestly, rotation of the grinder shaft 13 will result in a simultaneous rotation of the feeding attachment 19 and the operation of the feeder.

It will be noted that in the construction above described the feeding attachment is always driven in timed relation with the cutter, but it may be desirable, at times, to vary this relation, and this may be accomplished by providing the attachment with a variable speed drive, such as a pair of relatively movable friction discs, which may be adjusted at the will of the operator. Such a device is shown in Figs. 3 and 4, and comprises a standard 15' secured to the base of a grinder and having the operating shaft 19' and feeding member 21' with the spiral vane 23'. The shaft 19 may be driven through a gear 26' meshing with a gear 27' upon the outer end of a shaft 28'. The end of the shaft 28' has fixedly positioned thereon a friction disc 35, the face of which is engaged by the periphery of a friction disc 36 slidably held in position by a key 37 and a set screw 38 upon a vertical shaft 39, which has bearings 40 in outwardly extending arms 41 upon the standard. The shaft 39 may be driven through a bevel gear 42 upon its lower end from a bevel gear 43 upon a shaft 44 having bearings 45 in the standard 15'. The shaft 44 may be driven through gear 46 from the gear 14 upon the grinding machine. It will be clear that vertical adjustment of the disc 36 along its shaft to and from the axis of the disc 35 will result in a variation of the relative speeds of the grinding machine and the feeder.

It should be observed that in both forms of the device the entire attachment comprising the shafts and feeding member upon the vertical shaft are mounted upon the standard and form with the standard a unitary structure, applicable to and removable from the grinder with the standard as a unit.

I claim:

1. A feeding attachment for an ordinary meat grinding machine having a hopper, comprising a standard adapted to be secured in position adjacent a grinder, a rotatable shaft mounted on said standard, feeding means operated by said shaft and adapted to project into the hopper of a grinder, and variable speed means for driving said shaft from the driving mechanism of a grinding machine.

2. A feeding attachment for an ordinary meat grinding machine having a hopper, comprising a standard adapted to be secured in position adjacent a grinder, a rotatable shaft mounted on said standard, feeding means operated by said shaft and adapted to project into the hopper of a grinder, and variable speed friction means for driving said shaft from the driving mechanism of a grinding machine.

3. The combination with a meat grinding machine having a hopper, of a feeding attachment comprising a standard positioned adjacent said hopper, a rotatable shaft mounted on said standard, feeding means operated by said shaft and projecting into said hopper, means for operating said grinding machine, and variable speed driving connections between said grinder operating means and said shaft.

4. A feeding attachment for an ordinary meat grinding machine having a hopper comprising a standard adapted to be secured adjacent a grinding machine, a rotatable shaft on said standard, a spiral feeding member on said shaft adapted to project into the hopper of a grinding machine, said feeding member being separable from the standard, and variable speed driving means for rotating said shaft from the driving shaft of a grinding machine.

5. A feeding attachment for an ordinary meat grinding machine having a hopper comprising a standard, a rotatable shaft on said standard, a feeding spiral on said shaft, and driving connections for rotating said shaft from the driving shaft of a meat grinder, said driving connections comprising a second shaft mounted on said standard, and variable speed driving means for said second shaft.

6. A feeding attachment for an ordinary meat grinding machine having a hopper, comprising a standard adapted to be secured in position adjacent a grinder and having a portion to extend over a hopper, a rotatable shaft removably mounted in a bearing on said portion of the standard, feeding means operated by said shaft and adapted to project into the hopper of a grinder, and means for driving said shaft from the driving mechanism of a grinding machine.

7. The combination with a meat grinding machine having a hopper, of a feeding attachment comprising a standard adapted to be secured in position adjacent the grinder and having a portion extending over the hopper, a rotatable shaft removably mounted in a bearing on said portion of the standard, feeding means operated by said shaft and adapted to project into the hopper of the grinder, and means for driving said shaft from the driving mechanism of the grinding machine.

8. The combination with a meat grinding machine having a hopper, of a feeding attachment comprising a standard positioned adjacent the hopper and having a horizontal portion extending over the hopper, a substantially vertical rotatable shaft mounted in a bearing on said portion of the standard and projecting into the hopper, feeding means upon said shaft, means for operating said grinding machine, and driving connections between said grinder operating means and said shaft, said driving connections comprising a second substantially horizontal shaft mounted in a bearing upon said standard, and gearing connecting said shafts.

9. A feeding attachment for an ordinary meat grinding machine having a hopper, comprising a standard adapted to be secured in position adjacent a grinder and having a substantially horizontal portion adapted to extend over a hopper, a bearing in said standard portion having two relatively movable portions and adapted to be opened to permit the insertion of a shaft therein, a vertical shaft removably mounted in said bearing, feeding means upon said shaft, and means for driving said shaft from the drive mechanism of a grinding machine, said driving means comprising at least one additional substantially horizontal shaft mounted on said standard.

10. A feeding attachment for an ordinary grinding machine having a hopper, comprising a standard adapted to be secured adjacent a grinding machine and having a substantially horizontal portion adapted to extend over a hopper, a substantially vertical rotatable shaft mounted in a bearing on said standard portion, a spiral feeding member on said shaft adapted to project into the hopper of a grinding machine, and means for rotating said shaft from a grinding machine driving shaft, said rotating means comprising a pair of substantially horizontal shafts mounted on said standard.

11. The combination with an ordinary meat grinding machine having a hopper, of a unitary feeding attachment adapted to be associated with the grinding machine and comprising a standard having a horizontal portion extending over the hopper, a vertical shaft mounted in a bearing in said standard portion and having a feeding member thereon, said feeding member being removable from the standard, and means for driving said shaft and feeding member from the driving mechanism of the grinding machine, said driving means comprising a pair of substantially horizontal shafts mounted on said standard, one of said shafts having thereon a driving member engaging a driving member upon the main shaft of the grinding machine, said feeding attachment having its parts entirely mounted upon said standard and being bodily removable from the grinding machine with said standard.

12. A feeding attachment for an ordinary meat grinding machine having a hopper, comprising a substantially L-shaped standard having a portion adapted to extend over the hopper of a grinding machine, a rotatable shaft mounted in a bearing on said portion of the standard, a feeding member on said shaft, and driving connections for rotating said shaft from the driving shaft of a meant grinder, said driving connections comprising a pair of substantially horizontal shafts mounted upon said standard, one of said shafts having a driving member thereon adapted to engage a driving member upon the main shaft of a meat grinder, said feeding attachment being applicable to and removable from a meat grinding machine as a unit with the standard.

In testimony whereof I have hereunto set my hand.

DANIEL D. LONG.